(12) United States Patent
Walter et al.

(10) Patent No.: US 11,347,551 B2
(45) Date of Patent: May 31, 2022

(54) METHODS, SYSTEMS, ARTICLES OF MANUFACTURE AND APPARATUS TO MANAGE MEMORY ALLOCATION

(71) Applicant: Intel Corporation, Santa Clara, CA (US)

(72) Inventors: Zigi Walter, Haifa (IL); Anat Heilper, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 241 days.

(21) Appl. No.: 16/539,496

(22) Filed: Aug. 13, 2019

(65) Prior Publication Data
US 2019/0370072 A1 Dec. 5, 2019

(51) Int. Cl.
*G06F 9/50* (2006.01)
*G06F 12/02* (2006.01)

(52) U.S. Cl.
CPC .......... *G06F 9/5016* (2013.01); *G06F 9/5022* (2013.01); *G06F 12/023* (2013.01)

(58) Field of Classification Search
CPC ..... G06F 9/5016; G06F 9/5022; G06F 12/023
See application file for complete search history.

(56) References Cited

U.S. PATENT DOCUMENTS

| | | | | |
|---|---|---|---|---|
| 4,760,374 A * | 7/1988 | Moller | ..................... | G06F 7/026 340/146.2 |
| 6,675,278 B1 * | 1/2004 | Chowdhary | ........ | G06F 12/0238 711/203 |
| 6,751,718 B1 * | 6/2004 | Manin | ..................... | G06F 12/08 711/170 |
| 7,421,539 B1 * | 9/2008 | Seidl | ................... | G06F 12/0269 711/133 |
| 7,620,793 B1 * | 11/2009 | Edmondson | ........ | G06F 12/0607 345/552 |
| 2009/0249015 A1 * | 10/2009 | Tzeng | ................. | G06F 12/0246 711/165 |

FOREIGN PATENT DOCUMENTS

CN 112395217 2/2021

OTHER PUBLICATIONS

2019 CES: Intel showcases new technology for next era of computing, retrieved from https://newsroom.intel.com/news/, on Jul. 9, 2019, 9 pages.

* cited by examiner

*Primary Examiner* — Emerson C Puente
*Assistant Examiner* — Jonathan R Labud
(74) *Attorney, Agent, or Firm* — Hanley, Flight & Zimmerman, LLC

(57) ABSTRACT

Methods, apparatus, systems and articles of manufacture are disclosed to manage memory allocation. An example apparatus includes a memory detector to scan a platform for available memory. The example apparatus also includes a memory size checker to retrieve a virtual memory layout associated with the available memory devices associated with the platform and to determine whether virtual address boundaries of respective ones of a available memory device generate a virtual address gap therebetween. The example apparatus also includes a address assigner to reassign virtual addresses of at least one of the respective ones of the available memory devices to remove the virtual address gap.

17 Claims, 6 Drawing Sheets

METHODS, SYSTEMS, ARTICLES OF MANUFACTURE AND APPARATUS TO MANAGE MEMORY ALLOCATION

FIELD OF THE DISCLOSURE

This disclosure relates generally to memory assignment, and, more particularly, to methods, systems, articles of manufacture and apparatus to manage memory allocation.

BACKGROUND

In recent years, memory usage has increased as computing devices are expected to handle a relatively greater number of tasks in a relatively reduced amount of time. Scratchpad memory has limited capacity but is often closely coupled with the processor, allowing for rapid and deterministic retrieval of data. In contrast, cache memory offers significantly more storage at the cost of a longer retrieval time. While both scratchpad and cache memory are located closer to the processor than larger mass storage such as dynamic random-access storage (DRAM), they are traditionally separate from each other.

Figure 1:
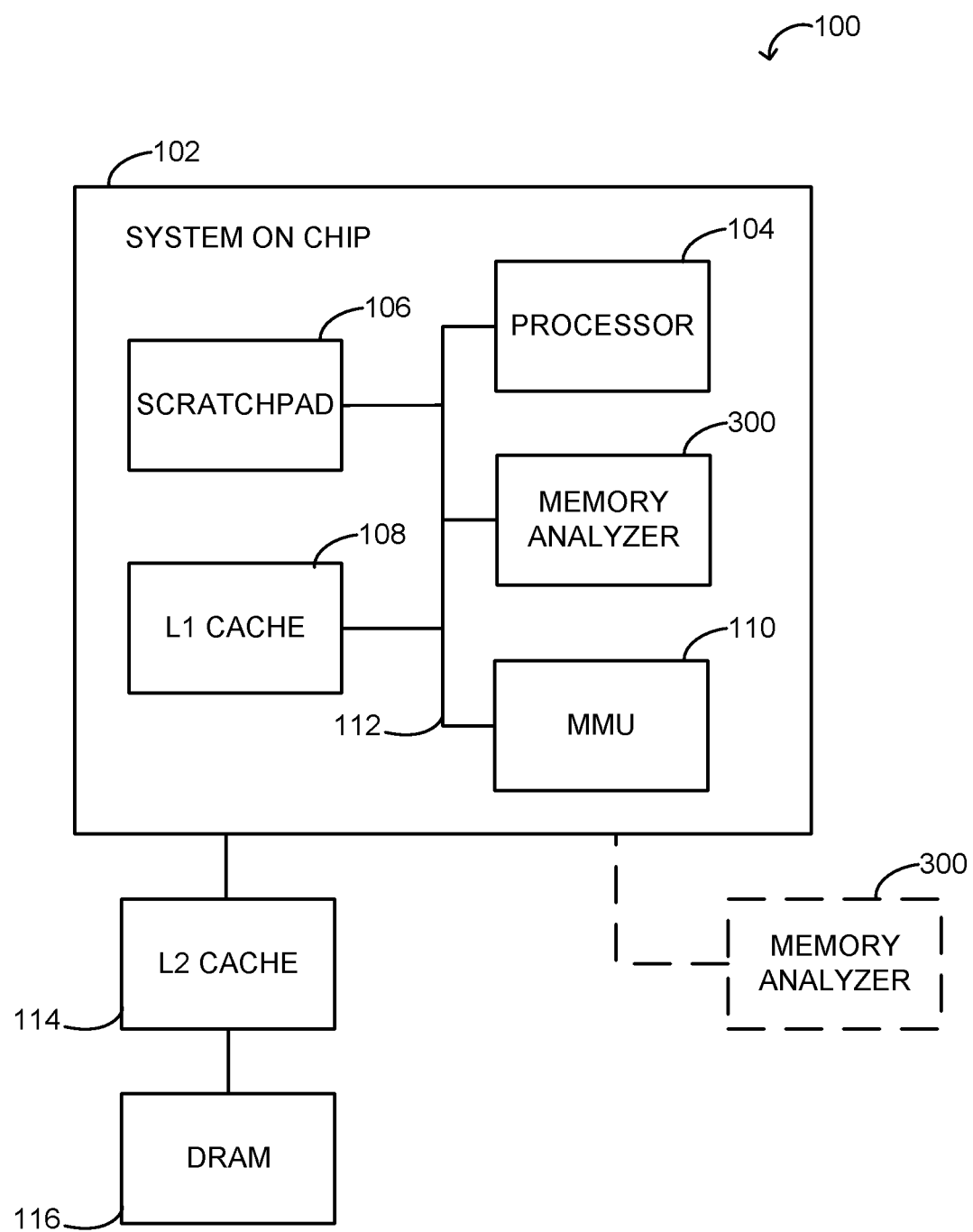
FIG. 1 is a schematic illustration of an example platform including a system on chip.

The figures are not to scale. In general, the same reference numbers will be used throughout the drawing(s) and accompanying written description to refer to the same or like parts. Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Different types of memory are associated with different properties, such as memory size and data operation (e.g., retrieval, storage, etc.) time. As used herein, scratchpad memory is a type of memory exhibiting a relatively fast operation time as compared to other types of memory. As used herein, cache memory is a type of memory exhibiting a relatively slower operation time as compared to scratchpad memory. Example scratchpad memory and one or more other types of cache memory are located on a platform, a chipset, and/or are part of a system-on-chip (SOC) assembly. In some examples, other types of memory are located on one or more separate structures accessible via one or more bus communication techniques. Regarding size, cache memory often has a relatively larger storage capacity than scratchpad memory. However, the larger cache memory having the relatively larger capacity is often associated with higher access latencies (e.g., write requests, read requests, replace requests, etc.) due to, in part, the cache memory being located further away from the processor. Ideally, data buffers (e.g., portions of data that require memory operations, such as write requests, read requests, etc.) that are used often and therefore require rapid retrieval time are placed in the closest compatible memory space (e.g., scratchpad memory) to the processor to reduce delays during computational tasks of the processor.

FIG. 1 illustrates an example platform 100 that includes an example SOC 102. As used herein, the example platform 100 includes a processor and memory in a nonlimiting way. The example platform 100 can be, for example, a SOC, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device. In the illustrated example of FIG. 1, the SOC 102 includes an example processor 104 communicatively connected to scratchpad memory 106 and an example L1 cache 108. The example SOC 102 includes an example memory management unit (MMU) 110 to facilitate memory management operations, such as the use of random access memory (RAM), different types of cache memory, scratchpad memory, and/or other memory access needs of the example processor 104. The aforementioned structure and/or software (depending on the manner of implementation to manage memory allocation) of FIG. 1 is communicatively connected (and/or interconnected) by an example SOC bus 112. As described above, the example scratchpad memory 106 exhibits relatively low latency characteristics as compared to the example L1 cache 108 and, typically, is located proximately closer to the example processor 104 than the example L1 cache 108. More generally, SOCs, such as the example SOC 102 of FIG. 1, are often slightly larger compared to central processing units but with the added benefit of lower power consumption due to a higher level of integration. This makes SOCs preferable for mobile computing, such as transmission of data.

In some examples, available memory for the SOC 102 is not limited to the example scratchpad memory 106 and the example L1 cache memory 108 of FIG. 1, as one or more additional and/or alternate memory structures may be available. In some examples, the SOC 102 is communicatively connected to example L2 cache memory 114, dynamic random access memory (DRAM) 116, and/or other memory structure(s) (not shown). In some examples, memory is referred to herein as a memory device (e.g., a DRAM device, a scratchpad memory device, etc.). As described in further detail below, the example platform includes an example memory analyzer 300 to manage memory allocation. In some examples, the memory analyzer 300 is communicatively connected to the example SOC 102 (e.g., via one or more communication lines/busses), while in some examples the memory analyzer 300 is integrated into the example SOC 102.

Figure 2:
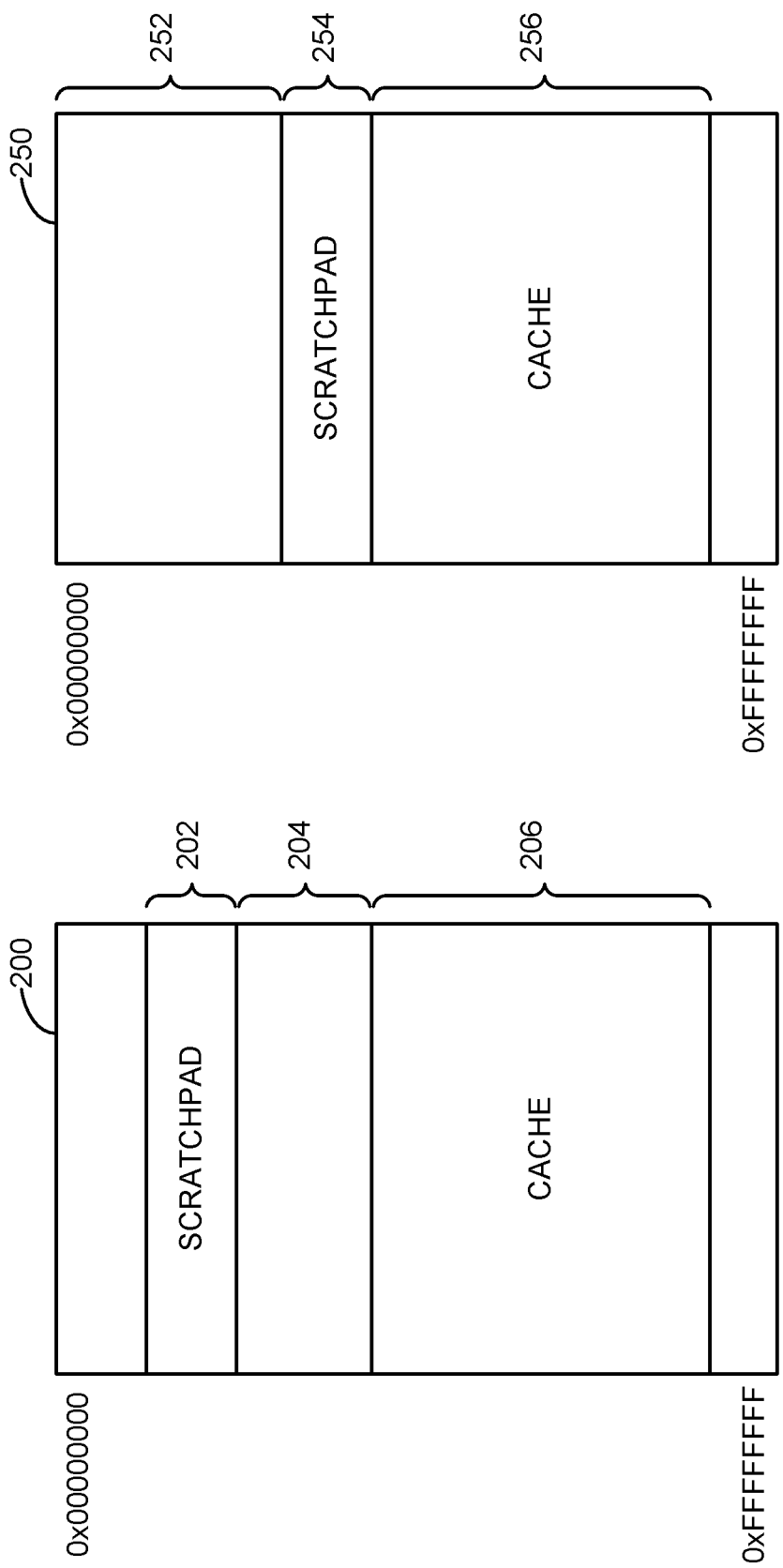
FIG. 2A and FIG. 2B are illustrations of example virtual memory map layouts of scratchpad and cache memory.

Memory performance depends on different configurations of scratchpad and cache memory in addition to the size of the data (e.g., a data buffer) to be stored. Traditionally, the cache and scratchpad virtual memory addresses are non-continuous. FIG. 2A illustrates an example virtual memory layout 200 in which cache memory and scratchpad memory occupy non-continuous virtual memory assignments (e.g., by virtue of non-occupied addresses therebetween). In the illustrated example of FIG. 2A, the virtual memory layout 200 includes an example first set of virtual memory addresses 202 that have been assigned to scratchpad memory, an example second set of virtual memory addresses 204 that have not been assigned, and an example third set of virtual memory addresses 206 that have been assigned to cache memory (e.g., L1 cache, L2 cache, etc.). As used herein, a virtual address boundary refers to the point of separation between two sets of virtual memory addresses (e.g. between the example first set of virtual memory addresses 202 and the example second set of virtual memory addresses 204). Additionally, a virtual address gap refers to a set of virtual memory addresses that have not yet been assigned (e.g. the example second set of virtual memory addresses 204). In some examples, virtual memory assignments are assigned by one or more components of the example platform 100 during power-on, such as assigned by the example MMU 110. In some examples, virtual memory assignments occur in a haphazard manner, or in a random manner.

During operation of the example platform 100, a data buffer (e.g., a request to/by the example processor 104 to manipulate or allocate data) may not fit within the available scratchpad memory associated with the example first set of virtual memory addresses 202. Such circumstances may be handled by the example platform 100 in different ways. In some examples, the MMU 110 places the data buffer entirely within the third set of memory addresses 206 associated with the cache memory. However, this approach overutilizes the limited memory within the cache and fails to take advantage of particular memory types and their corresponding characteristics. A second approach performed by the example platform 100 (e.g., by the example MMU 110) partitions the data buffer into (a) a section that can fit within the available first set of virtual memory addresses 202 associated with the scratchpad memory and to (b) the example third set of virtual memory addresses 206 that "spills over" into cache memory. While this example approach optimally utilizes the particular beneficial characteristics associated with the scratchpad memory, it requires special handling (e.g., software handling), thus increasing complexity and potentially limiting the benefits of scratchpad memory. For example, in response to detecting a spillover condition, the example platform 100 (and/or components thereof) must calculate offset virtual addresses that jump from the boundary of the scratchpad addresses to the entry boundary of the cache addresses. Stated differently, the example platform 100 must calculate offset virtual addresses that jump over the example second set of virtual memory addresses 204 that have not been assigned to any memory.

Examples disclosed herein facilitate seamless mapping of scratchpad memory and cache memory to avoid and/or otherwise suppress platform resources that attempt to perform address calculations associated with a jump (e.g., a jump over the example second set of virtual memory addresses 204). However, it is to be understood that the virtual memory layout of available memory devices, in some examples, is preconfigured without a virtual address gap. Such preconfigured virtual memory layouts thereby permit a more efficient memory operation of the platform. FIG. 2B illustrates an example virtual memory layout 250 in which cache memory and scratchpad memory occupy continuous virtual memory assignments. In the illustrated example of FIG. 2B, the virtual memory layout 250 includes an example first set of virtual memory addresses 252 that have not been assigned (e.g., a virtual address gap), an example second set of virtual memory addresses 254 that have been assigned to scratchpad memory (e.g., a scratchpad memory device), and an example third set of virtual memory addresses 256 that have been assigned to cache memory (e.g., a cache memory device, such as an L1 cache device, an L2 cache device, etc.). While the illustrated example of FIG. 2B shows a particular order of memory types of the virtual memory layout 250, examples disclosed herein are not limited thereto. Other orders, types and/or quantities of memories may be represented in the example virtual memory layout 250 without limitation. As used herein, a seamless mapping of the scratchpad and cache memory ensures that the respective virtual addresses are continuous. This allows for optimal storage utilization of both the scratchpad and the cache memory while still using simple software retrieval methods ensuring that the benefits of the scratchpad memory remain. This also prevents a need for one or more calculations of virtual memory addresses to be performed by the example platform 100 (e.g., prevention of virtual memory offset calculations or jump address calculations).

Figure 3:
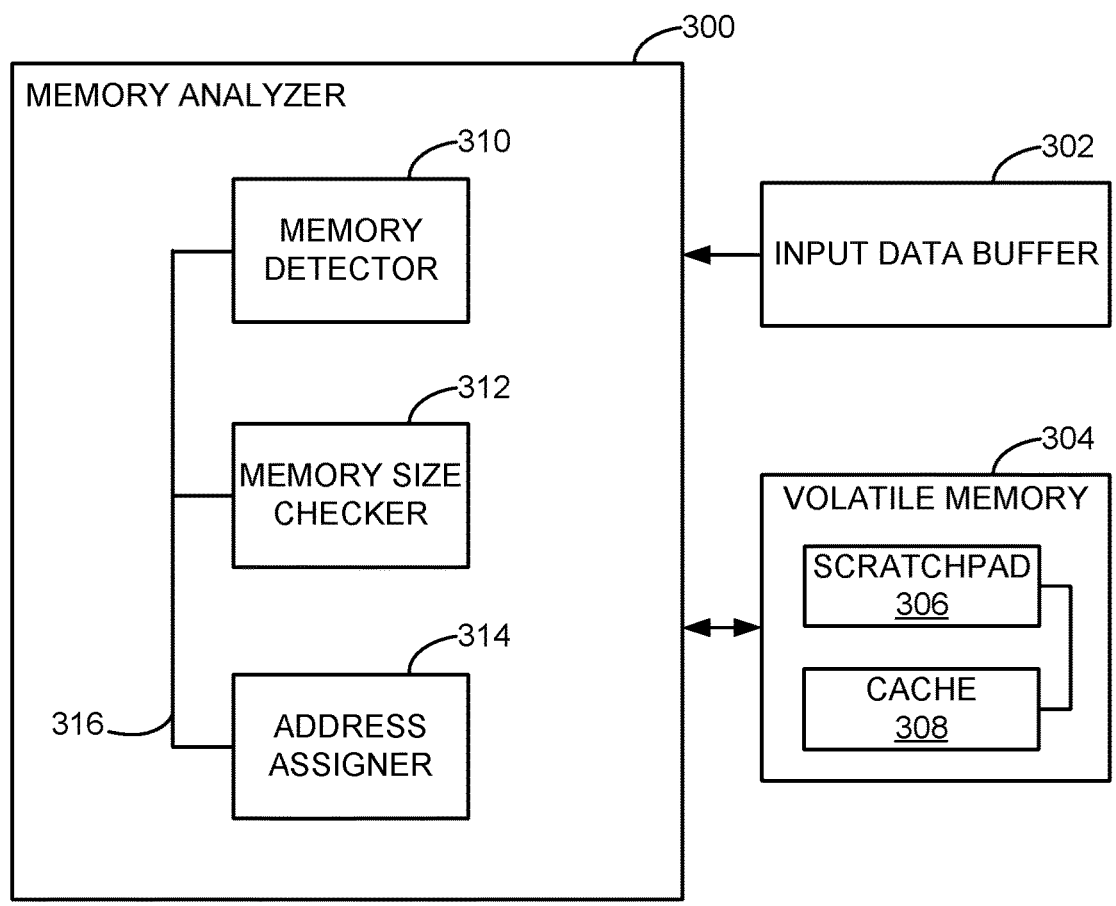
FIG. 3 is a schematic illustration of an example memory analyzer to analyze and assign available memory in accordance with teachings of this disclosure.

FIG. 3 is a schematic illustration of the example memory analyzer 300 to manage the allocation of memory (e.g. in an SOC). As described above, the example memory analyzer 300 may be located in the example platform 100, such as within the example SOC 102, or communicatively located external to the example SOC 102. However, other example configurations include but are not limited to the example memory analyzer 300 integrated within the example SOC 102, integrated within a chipset, or communicatively connected to the SOC via a bus that is external to the SOC.

In the illustrated example of FIG. 3, the memory analyzer 300 is communicatively connected to an example input data buffer 302 and volatile memory 304, which includes an example scratchpad memory 306 and an example cache memory 308. The example memory analyzer 300 of FIG. 3 also includes an example memory detector 310, an example memory size checker 312, and an example address assigner 314. The aforementioned structure and/or software (depending on the manner of implementation to manage memory allocation) of FIG. 3 is communicatively connected (and/or interconnected) by an example memory analyzer bus 316.

In operation, the example memory detector 310 retrieves and/or otherwise receives available data that requires one or more memory operations (e.g., data to be stored, data to be read, etc.). In some examples, the data (sometimes referred to herein as a data buffer) is to be stored/read-from the example volatile memory 304. The example memory detector 310 determines available virtual memory (referred to herein as candidate memory) associated with the example platform 100. In some examples, the memory detector 310 scans the platform 100 for memory storage devices, while in other examples the available memory storage devices are already mapped and/or otherwise assigned in virtual memory (e.g., having a virtual memory address mapping in a manner consistent with the illustrated example of FIG. 2A or FIG. 2B). In some examples, a platform is manufactured with a preconfigured set of memory devices, in which such memory devices have already been mapped to a virtual memory layout. However, in the event the platform experiences hardware changes, such as end-user additions to memory (e.g., more DRAM) and/or changes or removal of memory, then the example memory detector 310 is responsive to such platform changes.

In response to the example memory detector 310 identifying candidate memory associated with the platform, the example memory size checker 312 obtains memory configuration information. In some examples, the memory size checker 312 retrieves an existing virtual memory layout associated with the example platform 100, such as the example virtual memory layout 200 of FIG. 2A or the example virtual memory layout 250 of FIG. 2B. The example memory size checker 312 determines whether two or more memory devices have corresponding virtual addresses that are non-continuous. In the case of the example memory layout 200 of FIG. 2A, the example address assigner 314 reassigns the example first set of virtual memory addresses 202 to be continuous with the example third set of virtual memory addresses 206. In some examples, the example address assigner 314 sets a first flag after the first reassignment of the virtual addresses (e.g. the example first set of virtual memory addresses 202) of at least one memory device. Once the memory addresses of the example scratchpad memory 306 are continuous with the memory addresses of the example cache memory 308 (e.g. FIG. 2B), the example memory detector 310 enables memory allocation.

After memory allocation is enabled by the example memory detector 310, the example memory size checker 312 determines compatibility between the candidate memory and the example input data buffer 302. In some examples, "compatibility" refers to memory size characteristics in view of input data quantities, in which the candidate memory (e.g., scratchpad memory) and the example input data buffer 302 are incompatible due to size (e.g., the input data exceeds a storage capacity of the scratchpad memory). In such circumstances, the example memory detector 310 identifies a new candidate memory associated with the platform until a compatible candidate memory is found. In some examples, the memory detector 310 identifies at least one new or alternate memory associated with the platform that can accommodate (e.g., store) all or part of the input data buffer contents. For instance, if a first candidate memory (e.g., scratchpad) is identified by the example memory detector 310, but the scratchpad is not large enough to accommodate the entirety of the input data buffer contents, then the memory detector 310 identifies one or more additional memory to store the remainder of the input data buffer contents. Stated differently, the additional memory and the scratchpad memory, when combined, can accommodate the quantity/size of input data. The example address assigner 314 works with the example MMU 110 to assign the example input data buffer 302 to the candidate memory. In some examples, there are multiple example input data buffers 302 that are detected by the example memory detector 310 consecutively after each has been assigned to a candidate memory.

In some examples, (a) at least one memory operation request has occurred in which (b) the example memory detector 310 has identified candidate memory associated with the platform 100 and (c) virtual memory addresses have been assigned to facilitate continuous values from a first memory to a second memory (or more) (e.g., first memory addresses associated with a first memory device that are numerically consecutive with second memory addresses with a second memory device that are numerically consecutive with a third memory address, etc.). Stated differently, in some examples the memory analyzer 300 has analyzed the example platform 100 to generate an example virtual memory map in a manner consistent with example FIG. 2B in which the virtual addresses are continuous. In such circumstances, the example memory analyzer determines whether a memory operation has already occurred and determines whether such reassignment has occurred. If so, then repeating such analysis of the example platform 100 is unnecessary. In some examples, the memory analyzer 300 sets a flag if such analysis has already occurred and, if so, prevents such re-analysis in an effort to conserve computing resources and/or improve a speed at which memory operations occur.

In the event the example memory analyzer 300 determines that an analysis of the example platform 100 has already occurred and a corresponding memory remapping has occurred to cause virtual memory addresses to reside in a consecutive manner (e.g., see FIG. 2B), then the example memory analyzer 300 prevents, bypasses and/or otherwise suppresses one or more default processor directives from operating to calculate jump offset addresses. In other words, typical processor firmware or MMU 110 firmware includes a default set of instructions to generate offset jump calculations that allow disparate memory devices to store/access data buffer contents (e.g., to accommodate for data spillover when one of the memory devices is not large enough to store all input data). However, because such virtual addresses have already been reconfigured in a continuous manner, such jump calculations are no longer necessary and can be prohibited to conserve computational resources during runtime instances in response to memory operation requests.

While an example manner of implementing the platform 100 of FIG. 1 and the example memory analyzer 300 of FIG. 3 is illustrated in FIGS. 1, 2A, 2B and 3, one or more of the elements, processes and/or devices illustrated in FIGS. 1, 2A, 2B and 3 may be combined, divided, re-arranged, omitted, eliminated and/or implemented in any other way. Further, the example SOC 102, the example processor 104, the example scratchpad 106, the example L1 cache 108, the example MMU 110, the example platform 100, the example memory detector 310, the example memory size checker 312, the example address assigner 314 and/or, more generally, the example memory analyzer 300 of FIGS. 1 and 3 may be implemented by hardware, software, firmware and/or any combination of hardware, software and/or firmware. Additionally, the example SOC 102, the example processor 104, the example scratchpad 106, the example L1 cache 108, the example MMU 110, the example platform 100, the example memory detector 310, the example memory size checker 312, the example address assigner 314 and/or, more generally, the example memory analyzer 300 of FIGS. 1 and 3 may be implemented by hardware, software, firmware and/or any combination of hardware, software and/or firmware. Thus, for example, any of the example SOC 102, the example processor 104, the example scratchpad 106, the example L1 cache 108, the example MMU 110, the example platform 100, the example memory detector 310, the example memory size checker 312, the example address assigner 314 and/or, more generally, the example memory analyzer 300 of FIGS. 1 and 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). Furthermore, any of the example SOC 102, the example processor 104, the example scratchpad 106, the example L1 cache 108, the example MMU 110, the example platform 100, the example memory detector 310, the example memory size checker 312, the example address assigner 314 and/or, more generally, the example memory analyzer 300 of FIGS. 1 and 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example SOC 102, the example processor 104, the example scratchpad 106, the example L1 cache 108, the example MMU 110, the example platform 100, the example memory detector 310, the example memory size checker 312, the example address assigner 314 and/or, more generally, the example memory analyzer 300 of FIGS. 1 and 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example platform 100 of FIG. 1 and/or the example memory analyzer 300 of FIG. 3 may include one or more elements, processes and/or devices in addition to, or instead of, those illustrated in FIG. 1 and FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
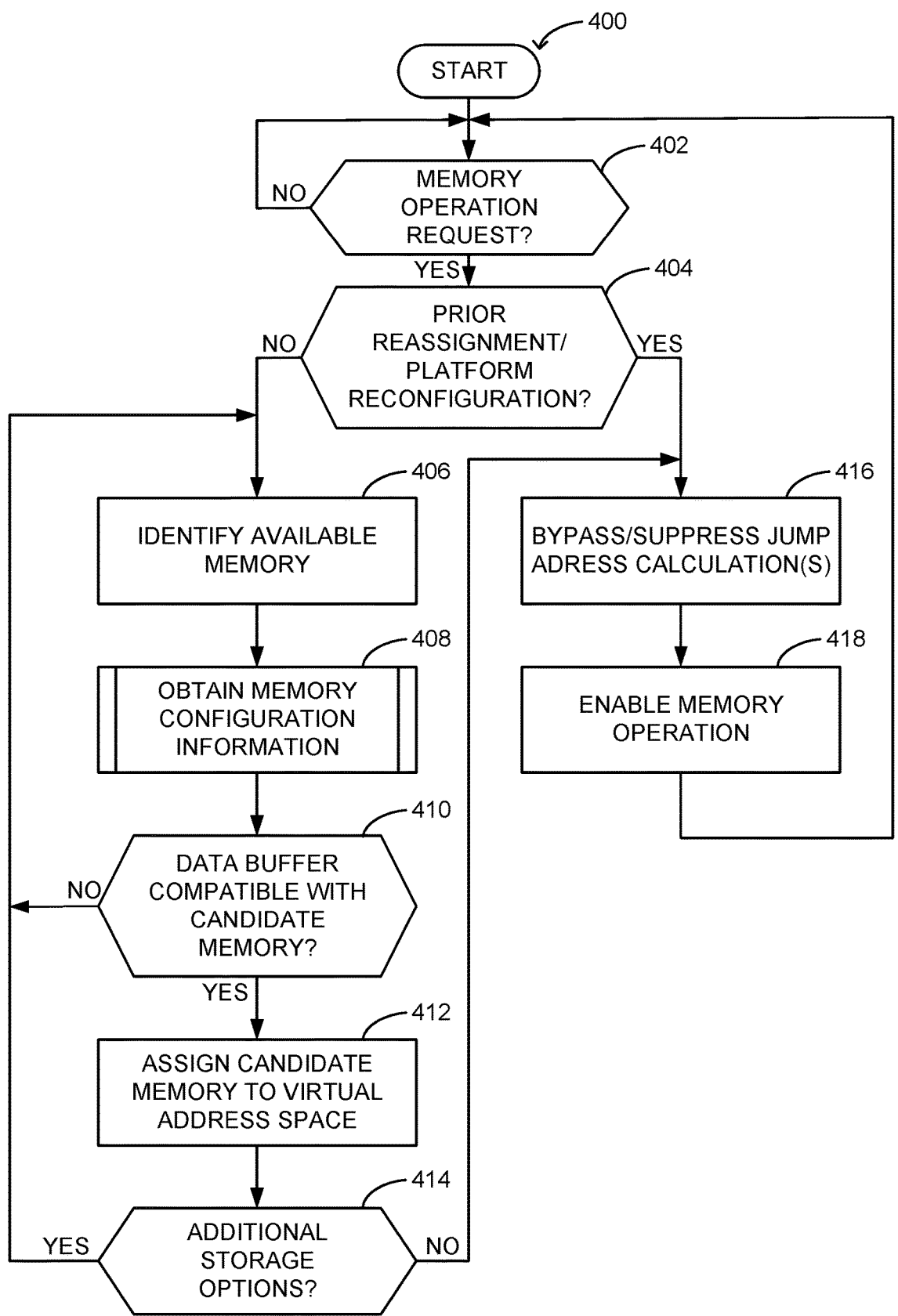
FIGS. 4-5 are flowcharts representative of example machine readable instructions which may be executed to implement the example memory analyzer of FIGS. 1 and 3 to manage memory allocation.
Figure 5:
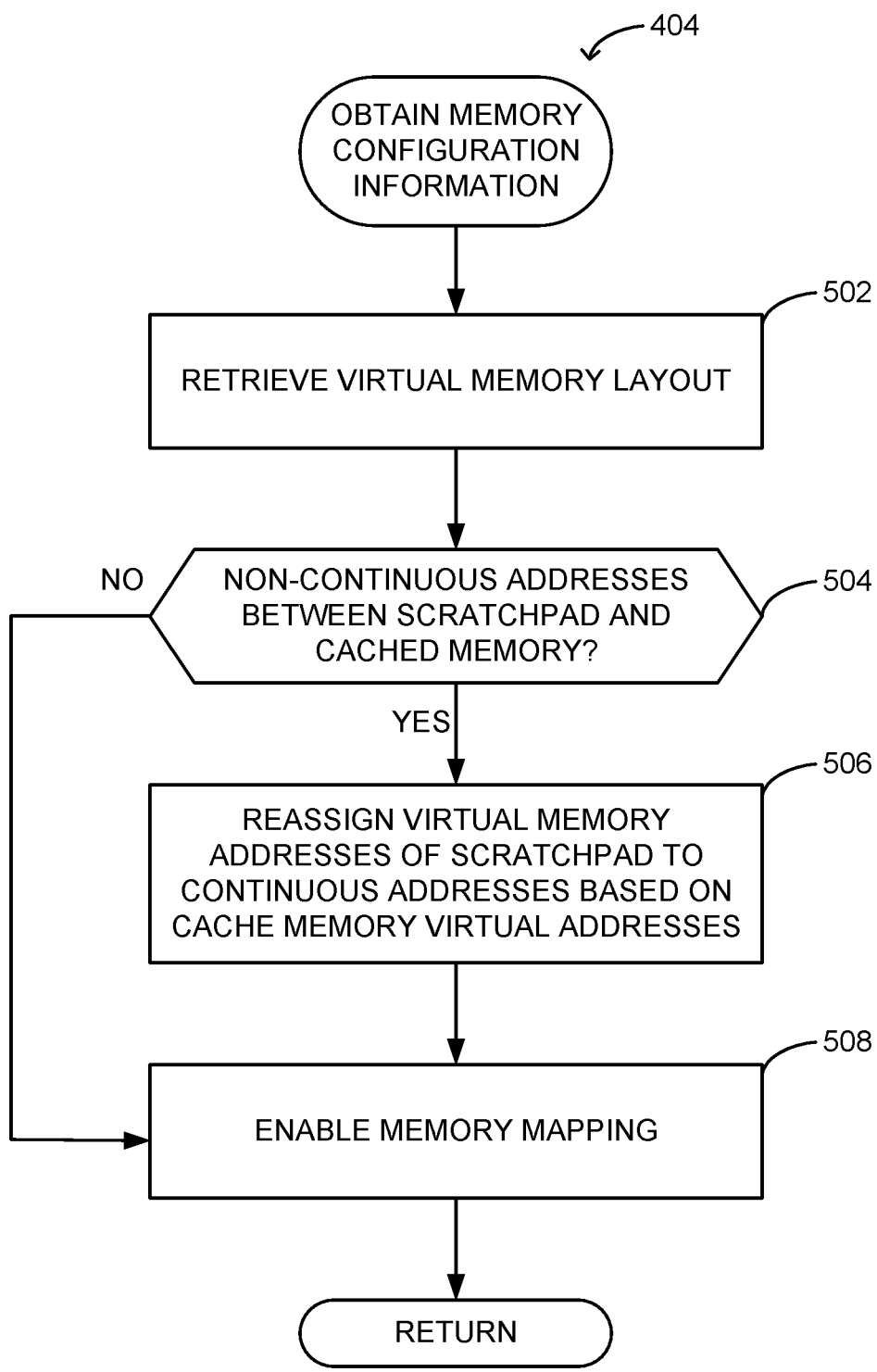

Flowcharts representative of example hardware logic, machine readable instructions, hardware implemented state machines, and/or any combination thereof for implementing the example platform 100 of FIG. 1 and/or the example memory analyzer 300 of FIGS. 1 and 3 are shown in FIGS. 4-5. The machine readable instructions may be one or more executable programs or portion(s) of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 4-5, many other methods of implementing the example platform 100 and the example memory analyzer 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 4-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program 400 of FIG. 4 includes block 402, in which the example memory analyzer 300 determines whether there is a memory operation request. In some examples, the example memory analyzer 300 determines that there is no memory operation request and waits (e.g., loops) until such a request is detected. In other examples, the example memory analyzer 300 determines that there is a memory operation request (block 402), in which the example memory analyzer 300 determines whether a prior virtual memory address reassignment and/or a platform reconfiguration has occurred (block 404). For instance, the memory analyzer 300 determines whether the example address assigner 314 has performed an address reassignment (e.g. remap virtual memory addresses to be consecutive) and/or a platform reconfiguration on a prior occasion (e.g. external memory added) (block 404).

In some examples, the example memory analyzer 300 detects no such prior virtual address reassignment and/or first platform reconfiguration (block 404). In other examples, the example memory analyzer 300 detects that an additional platform reconfiguration (e.g. external memory added) has occurred after at least one prior platform reconfiguration and generates a second flag. The example memory detector 310 retrieves, identifies and/or otherwise receives a candidate memory, such as the example scratchpad memory 306 and/or the example cache memory 308 of FIG. 3 (block 406). The example memory detector 310 also obtains the current memory configuration information of the candidate memory (block 408) to determine whether the virtual addresses of the scratchpad and cache memory are non-continuous (e.g. FIG. 2A) or continuous (e.g. FIG. 2B).

FIG. 5 illustrates additional detail associated with obtaining the memory configuration information of block 408. In the illustrated example of FIG. 5, the example memory size checker 312 retrieves the virtual memory layout (block 502). The example memory size checker 312 determines whether the example scratchpad memory 306 and example cache memory 308 in the example candidate memory have non-continuous addresses (block 504). If so, the example address assigner 314 reassigns the virtual memory address of the example scratchpad memory 306 to create continuous virtual addresses with the example cache memory 308 and sets a first flag (block 506). In other examples, the example memory size checker 312 detects a second flag (e.g. new platform reconfiguration) and the example address assigner 314 reassigns the virtual memory addresses of at least one of the respective memory devices. Once the example scratchpad memory 306 and cache memory 308 have been assigned continuous virtual addresses, the example memory detector 310 enables memory mapping (block 508) and returns to program 400 of FIG. 4. It is to be understood that the example scratchpad memory 306 and the example cache memory 308 can be preconfigured to have, in some examples, continuous virtual addresses (e.g. FIG. 2B). In this example, the example memory size checker 312 detects that the virtual memory device configuration does not contain a virtual address gap (block 504) and proceeds to enable memory mapping (block 508).

Returning to the illustrated example of FIG. 4, the example memory size checker 312 determines whether the example input data buffer 302 is compatible with the identified example candidate memory (block 410) and, if so, then the example address assigner 314 assigns the candidate memory to be used with the example input data buffer 302 (block 412) (e.g., the candidate memory being analyzed in this iteration is deemed large enough to accommodate the size of the input data buffer). In some examples, the program 400 of FIG. 4 returns to block 406 to identify another example candidate memory if the initial candidate memory and input data buffer 302 are not compatible (e.g., not large enough to accommodate the input data size). The example memory detector 310 also determines whether another example input data buffer 302 needs to be stored (block 414). In some examples, the example memory detector 310 identifies additional memory devices that could be used to process input data. For example, even if a previously evaluated candidate memory device is large enough to accommodate a size of the input data, there might be one or more additional candidate memory devices of the platform. As such, if the additional candidate memory devices of the platform are also arranged in a continuous addressing manner in virtual address space, then larger input data requests can be handled without a need to calculate jump offset address values. As such, the example memory detector 310 identifies the additional storage options that have not yet been analyzed (block 414), and control returns to block 406.

In other examples, the example memory detector 310 detects no other input data buffers (block 414) and control advances to block 416.

In some examples, the example memory analyzer 300 detects multiple memory operation requests. Once the example memory detector 310 detects no other input data buffers (block 414) or the example memory analyzer 300 determines a prior virtual memory address reassignment and/or platform reconfiguration has occurred (block 404), the example memory analyzer 300 prevents, bypasses and/or otherwise suppresses one or more default processor directives from operating to calculate jump offset addresses (block 416). The example memory analyzer 300 enables memory operation (e.g. a read, a write, a memory swap, etc.) and returns to block 402 (block 418).

Figure 6:
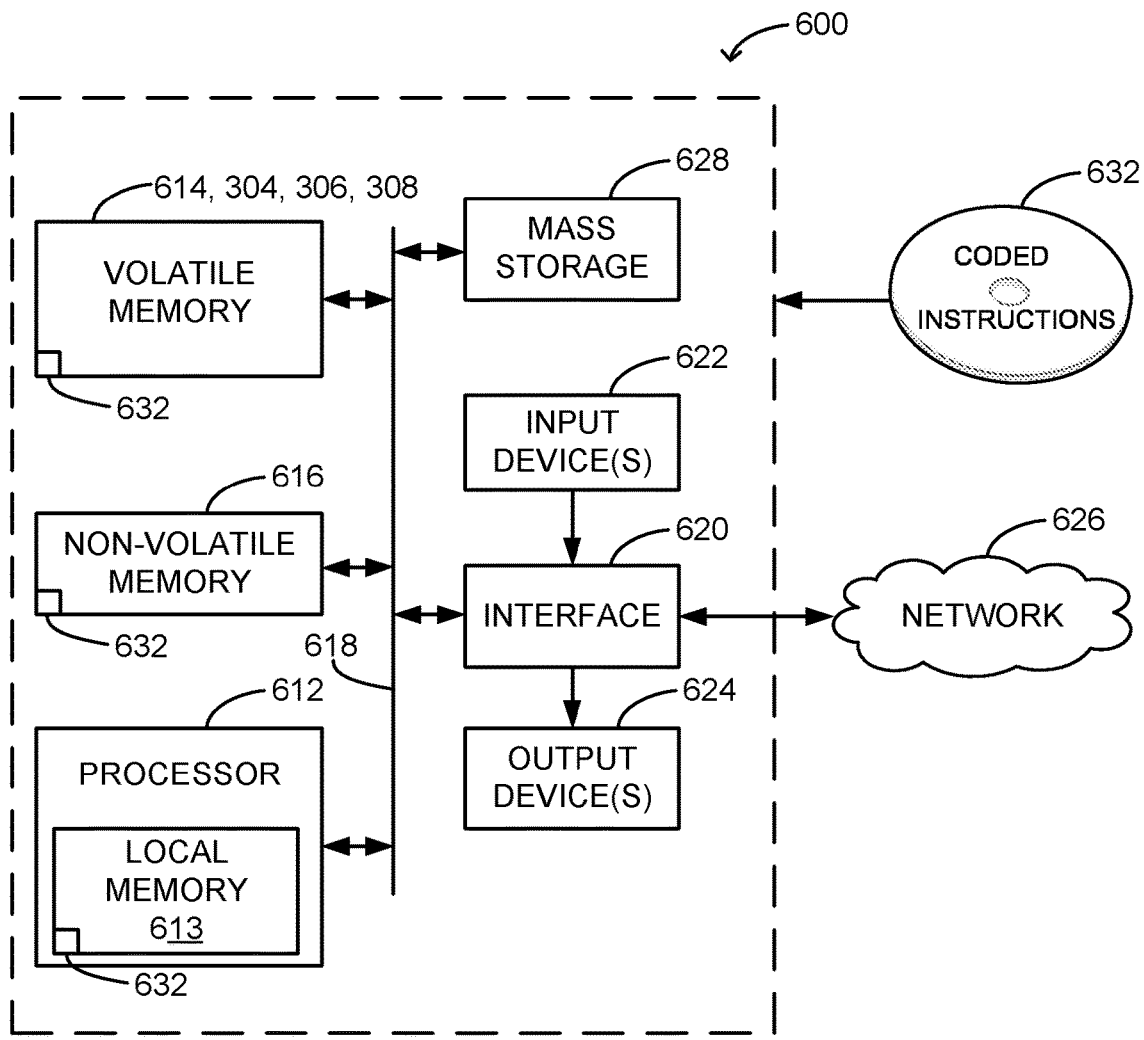
FIG. 6 is a block diagram of an example processing platform structured to execute the instructions of FIGS. 4-5 to implement the example memory analyzer of FIGS. 1 and 3.

FIG. 6 is a block diagram of an example processor platform 600 structured to execute the instructions of FIGS. 4-5 to implement the example platform 100 of FIG. 1 and the example memory analyzer 300 of FIGS. 1 and 3. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example SOC 102, the example processor 104, the example scratchpad 106, the example L1 cache 108, the example MMU 110, and/or, more generally, the example platform 100 of FIG. 1. Additionally, in this example the processor 612 implements the example input data buffer 302, the example volatile memory 304 consisting of the example scratchpad memory 306 and the example cache memory 308, the example memory detector 310, the example memory size checker 312, the example address assigner 314 and/or, more generally, the example memory analyzer 300 of FIG. 3.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 4-5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that facilitate communication between sub-processes of a memory management system to seamlessly map input data buffers to available scratchpad and cache memory. In some examples, dynamic communicative processes disclosed herein alert a processor of non-continuous scratchpad and cache memory so that corrective actions may be enacted prior to traditional memory mapping. For instance, in view of traditional memory mapping, the input data buffer may be solely stored in cache memory or split up between the scratchpad and cache memory, resulting in overutilization of cache memory and unnecessarily complicated software implementation that requires virtual address jump calculations at every instance of a memory operation. The disclosed methods, apparatus, systems and articles of manufacture improve the efficiency of using a computing device by preventing overuse of cache memory and complicated software implementations of handling data buffer storage. The disclosed methods, apparatus, systems and articles of manufacture are accordingly directed to one or more improvement(s) in the functioning of a computer.

Example methods, apparatus, systems, and articles of manufacture to manage memory allocation are disclosed herein. Further examples and combinations thereof include the following:

Example 1 includes an apparatus to reduce memory access operation time, the apparatus comprising a memory detector to scan a platform for available memory devices, a memory size checker to retrieve a virtual memory layout associated with the available memory devices associated with the platform, and determine whether virtual address boundaries of respective ones of the available memory devices generate a virtual address gap therebetween, and an address assigner to reassign virtual addresses of a first one of the respective ones of the available memory devices to remove the virtual address gap.

Example 2 includes the apparatus as defined in example 1, wherein the available memory devices include at least one of a scratchpad memory, a level one (L1) cache, a level two (L2) cache, or a dynamic random access memory (DRAM).

Example 3 includes the apparatus as defined in example 2, wherein the virtual memory layout of the available memory devices may be preconfigured without a virtual address gap.

Example 4 includes the apparatus as defined in example 1, wherein the memory size checker is to identify a second available memory device when a size of the input data exceeds a capacity of the first one of the respective ones of the available memory devices.

Example 5 includes the apparatus as defined in example 1, wherein the address assigner is to set a first flag in response to reassigning the virtual addresses at a first time.

Example 6 includes the apparatus as defined in example 5, further including a memory analyzer to prevent reanalysis of the platform in response to a memory operation request at a second time when the first flag is set.

Example 7 includes the apparatus as defined in example 5, wherein the memory analyzer is to prevent jump address calculation in response to a memory operation request at a second time when the first flag is set.

Example 8 includes the apparatus as defined in example 7, wherein the memory analyzer is to reanalyze the platform and generate a second flag in response to a memory device reconfiguration of the platform.

Example 9 includes the apparatus as defined in example 8, wherein the memory size checker is to detect the second flag after the memory device reconfiguration of the platform, the second flag to cause the address assigner to reassign virtual addresses of at least one of the respective ones of the available memory devices to remove the virtual address gap.

Example 10 includes a computer-implemented method to reduce memory access operation time, the method comprising scanning, by executing an instruction with at least one processor, a platform for available memory devices, retrieving, by executing an instruction with the at least one processor, a virtual memory layout associated with the available memory devices associated with the platform, determining, by executing an instruction with the at least one processor, whether virtual address boundaries of respective ones of the available memory devices generate a virtual address gap therebetween, and reassigning, by executing an instruction with the at least one processor, virtual addresses of a first one of the respective ones of the available memory devices to remove the virtual address gap.

Example 11 includes the computer-implemented method as defined in example 10, further including identifying a second available memory device when a size of the input data exceeds a capacity of the first one of the respective ones of the available memory devices.

Example 12 includes the computer-implemented method as defined in example 10, further including setting a first flag in response to reassigning the virtual addresses at a first time.

Example 13 includes the computer-implemented method as defined in example 11, further including preventing reanalysis of the platform in response to a memory operation request at a second time when the first flag is set.

Example 14 includes the computer-implemented method as defined in example 11, further including preventing jump address calculation in response to a memory operation request at a second time when the first flag is set.

Example 15 includes the computer-implemented method as defined in example 14, further including reanalyzing the platform and generating a second flag in response to a memory device reconfiguration of the platform.

Example 16 includes the computer-implemented method as defined in example 15, further including detecting the second flag after the memory device reconfiguration of the platform, the second flag to cause the address assigner to reassign virtual addresses of at least one of the respective ones of the available memory devices to remove the virtual address gap.

Example 17 includes a non-transitory computer readable storage medium comprising computer readable instructions that, when executed, cause at least one processor to, at least scan a platform for available memory devices, retrieve a virtual memory layout associated with the available memory devices associated with the platform, determine whether virtual address boundaries of respective ones of the available memory devices generate a virtual address gap therebetween, and reassign virtual addresses of a first one of the respective ones of the available memory devices to remove the virtual address gap.

Example 18 includes the non-transitory computer readable medium as defined in example 17, wherein the instructions, when executed, cause the at least one processor to identify a second available memory device when a size of the input data exceeds a capacity of the first one of the respective ones of the available memory devices.

Example 19 includes the non-transitory computer readable medium as defined in example 17, wherein the instructions, when executed, cause the at least one processor to set a first flag in response to reassigning the virtual addresses at a first time.

Example 20 includes the non-transitory computer readable medium as defined in example 19, wherein the instructions, when executed, cause the at least one processor to prevent reanalysis of the platform in response to a memory operation request at a second time when the first flag is set.

Example 21 includes the non-transitory computer readable medium as defined in example 19, wherein the instructions, when executed, cause the at least one processor to prevent jump address calculation in response to a memory operation request at a second time when the first flag is set.

Example 22 includes the non-transitory computer readable medium as defined in example 21, wherein the instructions, when executed, cause the at least one processor to reanalyze the platform and generate a second flag in response to a memory device reconfiguration of the platform.

Example 23 includes the non-transitory computer readable medium as defined in example 22, wherein the instructions, when executed, cause the at least one processor to detect the second flag after the memory device reconfiguration of the platform, the second flag to cause the address assigner to reassign virtual addresses of at least one of the respective ones of the available memory devices to remove the virtual address gap.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to reduce memory access operation time, the apparatus comprising:
   memory detector circuitry to scan a platform for available memory devices;
   memory size checker circuitry to:
      retrieve a virtual memory layout associated with the available memory devices associated with the platform; and
      determine whether virtual address boundaries of respective ones of the available memory devices generate a virtual address gap therebetween;
   address assigner circuitry to:
      reassign virtual addresses of a first one of the respective ones of the available memory devices to remove the virtual address gap; and
      set a first flag in response to reassigning the virtual address; and
   memory analyzer circuitry to, in response to a memory operation request, prevent a jump address calculation.

2. The apparatus as defined in claim 1, wherein the available memory devices include at least one of a scratchpad memory, a level one (L1) cache, a level two (L2) cache, or a dynamic random access memory (DRAM).

3. The apparatus as defined in claim 2, wherein the virtual memory layout of the available memory devices may be preconfigured without the virtual address gap.

4. The apparatus as defined in claim 1, wherein the memory size checker circuitry is to identify a second available memory device when a size of an input data exceeds a capacity of the first one of the respective ones of the available memory devices.

5. The apparatus as defined in claim 1, wherein the memory analyzer circuitry is to prevent reanalysis of the platform in response to a memory operation request at a second time when the first flag is set.

6. The apparatus as defined in claim 1, wherein the memory analyzer circuitry is to reanalyze the platform and generate a second flag in response to a memory device reconfiguration of the platform.

7. The apparatus as defined in claim 6, wherein the memory size checker circuitry is to detect the second flag after the memory device reconfiguration of the platform, the second flag to cause the address assigner circuitry to reassign virtual addresses of at least one of the respective ones of the available memory devices to remove the virtual address gap.

8. A computer-implemented method to reduce memory access operation time, the method comprising:
   scanning, by executing an instruction with processor circuitry, a platform for available memory devices;
   retrieving, by executing an instruction with the processor circuitry, a virtual memory layout associated with the available memory devices associated with the platform;
   determining, by executing an instruction with the processor circuitry, whether virtual address boundaries of respective ones of the available memory devices generate a virtual address gap therebetween;
   reassigning, by executing an instruction with the processor circuitry, virtual addresses of a first one of the respective ones of the available memory devices to remove the virtual address gap;
   setting, by executing an instruction with the processor circuitry, a first flag in response to reassigning the virtual address; and
   preventing, by executing an instruction with the processor circuitry, a jump address calculation.

9. The computer-implemented method as defined in claim 8, further including identifying a second available memory device when a size of an input data exceeds a capacity of the first one of the respective ones of the available memory devices.

10. The computer-implemented method as defined in claim 9, further including preventing reanalysis of the platform in response to a memory operation request at a second time when the first flag is set.

11. The computer-implemented method as defined in claim 8, further including reanalyzing the platform and generating a second flag in response to a memory device reconfiguration of the platform.

12. The computer-implemented method as defined in claim 11, further including detecting the second flag after the memory device reconfiguration of the platform and reassigning virtual addresses of at least one of the respective ones of the available memory devices to remove the virtual address gap.

13. A non-transitory computer readable storage medium comprising computer readable instructions that, when executed, cause processor circuitry to, at least:
   scan a platform for available memory devices;
   retrieve a virtual memory layout associated with the available memory devices associated with the platform;
   determine whether virtual address boundaries of respective ones of the available memory devices generate a virtual address gap therebetween;
   reassign virtual addresses of a first one of the respective ones of the available memory devices to remove the virtual address gap;
   set a first flag in response to reassigning the virtual address; and
   prevent a jump address calculation based on a the first flag.

14. The non-transitory computer readable medium as defined in claim 13, wherein the instructions, when executed, cause the processor circuitry to identify a second available memory device when a size of an input data exceeds a capacity of the first one of the respective ones of the available memory devices.

15. The non-transitory computer readable medium as defined in claim 7, wherein the instructions, when executed, cause the processor circuitry to prevent reanalysis of the platform in response to a memory operation request at a second time when the first flag is set.

16. The non-transitory computer readable medium as defined in claim 10, wherein the instructions, when executed, cause the processor circuitry to reanalyze the platform and generate a second flag in response to a memory device reconfiguration of the platform.

17. The non-transitory computer readable medium as defined in claim 16, wherein the instructions, when executed, cause the processor circuitry to detect the second flag after the memory device reconfiguration of the platform and reassign virtual addresses of at least one of the respective ones of the available memory devices to remove the virtual address gap.

* * * * *